US006913931B2

(12) United States Patent
Halverson et al.

(10) Patent No.: US 6,913,931 B2
(45) Date of Patent: Jul. 5, 2005

(54) DEVICES, METHODS AND SYSTEMS FOR LOW VOLUME MICROARRAY PROCESSING

(75) Inventors: Kurt J. Halverson, Lake Elmo, MN (US); Anila Prabhu, Woodbury, MN (US); Steven J. Botzet, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/263,592

(22) Filed: Oct. 3, 2002

(65) Prior Publication Data

US 2004/0067596 A1 Apr. 8, 2004

(51) Int. Cl.[7] .................. G01N 21/03; G01N 31/22; G01N 33/15; G01N 33/50
(52) U.S. Cl. ............... 436/165; 422/56; 422/57; 422/58; 436/43; 436/44; 436/46; 436/86; 436/94
(58) Field of Search ................ 436/43–44, 46, 436/86, 94, 165, 180, 183; 422/56–58, 64

(56) References Cited

U.S. PATENT DOCUMENTS

| 3,951,608 | A | * | 4/1976 | Trod ........................... 422/64 |
|---|---|---|---|---|
| 4,055,394 | A | * | 10/1977 | Friedman et al. ............. 422/56 |
| 4,146,364 | A | * | 3/1979 | McCormick |
| 4,673,657 | A | * | 6/1987 | Christian ..................... 436/501 |
| 4,990,459 | A | * | 2/1991 | Maeda et al. ................ 436/178 |
| 5,147,607 | A | * | 9/1992 | Mochida ....................... 422/57 |
| 5,281,540 | A | * | 1/1994 | Merkh et al. ................ 436/530 |
| 5,425,917 | A | * | 6/1995 | Schmid ......................... 422/63 |
| 5,567,595 | A | * | 10/1996 | Kok .......................... 435/7.92 |

(Continued)

FOREIGN PATENT DOCUMENTS

| EP | 0 106 324 | 4/1984 |
|---|---|---|
| WO | WO 99/09923 A1 | 3/1999 |

(Continued)

OTHER PUBLICATIONS

Fast Pak Family Product Page [online], "Fast Pak Single & Multiple Array Pads," Schleicher & Schuell Bioscience, Keene, NH, 2002 [retrieved from the internet on Sep. 18, 2002]. 3 pgs. Retrieved from the Internet: <URL:http://www.arraying.com/products/fast–pak–family.htm>.

(Continued)

*Primary Examiner*—Arlen Soderquist
(74) *Attorney, Agent, or Firm*—Christopher D. Gram; Robert W. Sprague

(57) ABSTRACT

Devices, methods and systems for low volume microarray processing are disclosed. The microarray devices preferably include a plurality of reactant sites on a reactant surface. The reactant sites include reactants that operate to capture one or more selected analytes that can then be detected based on an electromagnetic signal, e.g., fluorescence, that is emitted by each analyte in response to excitation energy incident on the microarray device. Mixing and/or distribution of the analyte sample over the reactant surface is accomplished by tilting the reactant surface such that the analyte sample flows over the reactant surface under the force of gravity. The tilting is performed such that a portion of the analyte sample accumulates in a bead along a first edge of the reactant surface. The reactant surface is then tilted in a different direction such that a portion of the analyte sample flows over the reactant surface and accumulates at a second edge. The reactant surface preferably generates sufficient capillary forces with the analyte sample such that the analyte sample is retained on the reactant surface. The tilting and resultant flow may be performed as many times as necessary to obtain the desired mixing and/or distribution of analyte sample over the reactant surface.

39 Claims, 7 Drawing Sheets

U.S. PATENT DOCUMENTS

| | | | |
|---|---|---|---|
| 5,580,790 A * | 12/1996 | Wall et al. .................... 436/45 |
| 5,674,006 A * | 10/1997 | Islam et al. .................. 366/239 |
| 5,728,446 A * | 3/1998 | Johnston et al. ............ 428/167 |
| 5,728,466 A | 3/1998 | Sekhar et al. |
| 5,770,860 A | 6/1998 | Franzen ....................... 250/288 |
| 6,140,044 A | 10/2000 | Besemer et al. |
| 6,168,948 B1 | 1/2001 | Anderson et al. |
| 6,194,160 B1 * | 2/2001 | Levin ......................... 435/7.1 |
| 6,228,659 B1 | 5/2001 | Kowallis et al. ............ 436/180 |
| 6,258,593 B1 | 7/2001 | Schembri et al. |
| 6,268,210 B1 | 7/2001 | Baier et al. |
| 6,290,685 B1 | 9/2001 | Insley et al. |
| 6,309,875 B1 | 10/2001 | Gordon |
| 6,350,618 B1 | 2/2002 | Borrelli et al. ............. 436/174 |
| 6,372,954 B1 | 4/2002 | Johnston et al. |
| 6,386,749 B1 | 5/2002 | Watts et al. |
| 6,391,578 B2 * | 5/2002 | Williams et al. .............. 435/39 |
| 6,391,623 B1 | 5/2002 | Besemer et al. |
| 6,395,483 B1 | 5/2002 | Patil et al. |
| 6,399,365 B2 | 6/2002 | Besemer et al. |
| 6,406,851 B1 | 6/2002 | Bass |
| 6,420,114 B1 | 7/2002 | Bedilion et al. |
| 6,422,249 B1 | 7/2002 | Certa et al. |
| 6,431,695 B1 | 8/2002 | Johnston et al. |
| 6,485,918 B1 * | 11/2002 | Schermer et al. ............... 435/6 |
| 6,492,133 B1 * | 12/2002 | Wickert et al. ............... 435/34 |
| 2001/0005327 A1 | 6/2001 | Duane et al. |
| 2001/0046702 A1 | 11/2001 | Schembri |
| 2002/0001803 A1 | 1/2002 | Smith et al. |
| 2002/0001839 A1 | 1/2002 | Schembri et al. |
| 2002/0012910 A1 | 1/2002 | Weiss et al. |
| 2002/0022261 A1 | 2/2002 | Anderson et al. |
| 2002/0039728 A1 | 4/2002 | Kain et al. |
| 2002/0052042 A1 | 5/2002 | Gordon |
| 2002/0058331 A1 | 5/2002 | Besemer et al. |
| 2002/0071339 A1 | 6/2002 | Winkler et al. |
| 2002/0095073 A1 | 7/2002 | Jacobs et al. |
| 2002/0102578 A1 | 8/2002 | Dickinson et al. |
| 2002/0164235 A1 | 11/2002 | Norris et al. |
| 2002/0168624 A1 | 11/2002 | Yuen |

FOREIGN PATENT DOCUMENTS

| | | |
|---|---|---|
| WO | WO 99/53319 A3 | 10/1999 |
| WO | WO 99/53319 A2 | 10/1999 |
| WO | WO 99/65664 A1 | 12/1999 |
| WO | WO 01/01093 A1 | 1/2001 |
| WO | WO 01/30489 A3 | 5/2001 |
| WO | WO 01/30489 A2 | 5/2001 |
| WO | WO 01/32934 A2 | 5/2001 |
| WO | WO 01/32934 A3 | 5/2001 |
| WO | WO 01/44515 A2 | 6/2001 |
| WO | WO 01/44515 A3 | 6/2001 |
| WO | WO 01/59432 A3 | 8/2001 |
| WO | WO 01/59432 A2 | 8/2001 |
| WO | WO 02/31187 A1 | 4/2002 |
| WO | WO 01/43871 A3 | 6/2002 |
| WO | WO 01/43871 A2 | 6/2002 |
| WO | WO 02/44713 A3 | 6/2002 |
| WO | WO 02/44713 A2 | 6/2002 |
| WO | WO 02/083839 A2 | 10/2002 |

OTHER PUBLICATIONS

Product Information Brochure, "FAST™ PAK Protein Array Kit Protocol," Schleicher & Schuell BioScience, Keene, NH, 4 pgs (including Table of Contents) (no date available).

Schleicher & Schuell Bioscience Product Catalog, "Products for Life Science Research 2002 Catalog," Schleicher & Schuell BioScience, Keene, NH, 48 pgs. (Jan. 3, 2002).

* cited by examiner

DEVICES, METHODS AND SYSTEMS FOR LOW VOLUME MICROARRAY PROCESSING

BACKGROUND

The present invention relates to devices, methods and systems for low volume microarray processing.

Microarrays may be used in a variety of processes, such as gene sequencing, monitoring gene expression, gene mapping, bacterial identification, drug discovery, combinatorial chemistry, etc. Many of these applications involve expensive and/or difficult to obtain analyte samples and/or reagents. Dilution of minute analyte samples to higher volumes for processing can be problematic. For example, dilution of minute quantities of the analyte sample to higher volumes can result in concentrations that may be either difficult to detect or that require inordinately long processing times.

Accordingly, microarrays are desirable because the use of such arrays may allow for lower volumes of analyte sample. Processing with a microarray may involve, for example, placing a small drop of analyte sample (e.g., 10–20 microliters) on the microarray, followed by distribution of the analyte sample over the microarray surface by addition of a coverslip. The coverslip provides both compressive weight and capillary forces in the gap between the coverslip and the microarray surface that distribute the analyte sample over the microarray surface. Those same capillary forces, however, typically prevent mixing or even distribution of the analyte sample over the microarray surface—working instead to limit diffusion of analyte molecules over the microarray surface.

One approach to addressing the issue of diffusion or mixing of the analyte sample over the microarray surface involves the use of pumping mechanisms. This approach is not, however, without its own disadvantages. For example, to obtain a volume sufficient for pumping, the analyte sample volume may need to be increased by the use of additional analyte sample or dilution of a given amount of analyte sample. In addition, the pumping mechanisms increase the complexity of the processing systems. Furthermore, in some systems that employ pumps, further agitation of the analyte sample on the microarray is performed by use of a vortexer (similar to paint mixer) in an attempt to provide adequate diffusion of the analyte molecules over the microarray surface.

Another potential disadvantage of systems employing pumps to obtain diffusion of target molecules is that the microarray surface must typically be enclosed within a sealed chamber to contain the analyte sample during pumping and/or agitation. As a result, the microarray devices must typically be designed for use in a package that can provide the needed sealed chamber. That packaging further adds to the cost and complexity of the microarrays.

Yet another potential disadvantage of sealed chambers used to package the microarrays is the formation of fluid retention interfaces within the chamber at, e.g., the junction of walls and other corners where the surface tension of the fluids results in fluid retention. The retained fluid is not capable of distribution across the surface of the microarray.

SUMMARY OF THE INVENTION

The present invention provides devices, methods and systems for low volume microarray processing. The microarray devices preferably include a plurality of reactant sites on a reactant surface. The reactant sites include reactants that operate to capture one or more selected analytes that can then be detected based on an electromagnetic signal, e.g., fluorescence, that is emitted by each analyte in response to excitation energy incident on the microarray device.

Mixing and/or distribution of the analyte sample over the reactant surface is accomplished by tilting the reactant surface such that the analyte sample flows over the reactant surface. The tilting is performed such that a portion of the analyte sample accumulates in a bead along a first edge of the reactant surface. The reactant surface is then tilted in a different direction such that a portion of the analyte sample flows over the reactant surface and accumulates at a second edge. The reactant surface preferably generates sufficient capillary forces with the analyte sample such that the analyte sample is retained on the reactant surface. The tilting and resultant flow may be performed as many times as necessary to obtain the desired mixing and/or distribution of analyte sample over the reactant surface.

In accordance with the principles of the present invention, the tilting is performed while the analyte sample is exposed on the reactant surface. As used in connection with the present invention, the analyte sample is "exposed" when a portion of the analyte sample is free to flow and accumulate in exposed or uncovered beads along edges of the reactant surface in response to tilting of the reactant surface. In contrast, for example, placement of a coverslip in contact with the analyte sample on the reactant surface would not provide an exposed analyte sample because flow of the analyte sample would be restricted by the coverslip. In another manner of characterizing the present invention, the exposed analyte sample is retained on the reactant surface during tilting in the absence of sidewalls, covers or other structures rising above the reactant surface. Furthermore, the exposed analyte sample can be described as being in contact only with the reactant surface (as opposed to known devices in which the analyte sample is in contact with coverslips and/or sidewalls in addition the surface of the array)

One advantage of the present invention may be, for example, the ability to adequately distribute and/or mix a low volume analyte sample over a reactant surface. As used herein, a "low volume" analyte sample means 10 microliters or less of analyte sample per square centimeter of reactant surface. It may be preferred that "low volume" as used herein mean 5 microliters or less of analyte sample per square centimeter of reactant surface.

Another advantage of the present invention may be, for example, the distribution and/or mixing of an analyte sample over a reactant surface using non-turbulent fluid flow to reduce or prevent analyte sample or reagent degradation during processing.

Other advantages of the present invention may include, for example, avoiding the need for any external pumping devices associated with the microarray devices, no fluidic connections between pumping devices and the chamber in which the microarray device is located, avoiding the need for sealed reaction chambers over the microarray devices, and a reduction or elimination of liquid retention interfaces between the reactant surface and the packaging.

"Analyte" as used in connection with the present invention shall mean a molecule, compound, composition or complex, either naturally occurring or synthesized, to be detected or measured in or separated from a sample of interest. Analytes include, without limitation, proteins, peptides, amino acids, fatty acids, nucleic acids, carbohydrates, hormones, steroids, lipids, vitamins, bacteria, viruses, pharmaceuticals, and metabolites.

"Reactant site" as used in connection with the present invention shall mean a distinct location on a surface that includes any chemical molecule, compound, composition or complex, either naturally occurring or synthesized, that is capable of binding an analyte either alone or in conjunction with a molecule or compound that assists in binding the analyte to the substrate, such as, for example, a coenzyme. The reactants at the reactant sites of the present invention are useful for chemical or biochemical measurement, detection, separation, etc. Examples of reactants include, without limitation, amino acids, nucleic acids (including oligonucleotides and cDNA), carbohydrates, and proteins (such as enzymes and antibodies).

In one aspect, the present invention provides a method of contacting a reactant with an analyte by providing a microarray device including a reactant surface, wherein the reactant surface has a plurality of reactant sites dispersed over the reactant surface, wherein the plurality of reactant sites are distinct from each other, and wherein the reactant surface includes a first edge and a second edge located opposite each other; depositing a quantity of a liquid and an analyte on the reactant surface; tilting the reactant surface in a first direction about an axis of rotation, wherein a portion of the liquid moves towards the first edge of the reactant surface under the force of gravity; tilting the reactant surface in a second direction about the axis of rotation, wherein a portion of the liquid moves from the first edge towards the second edge under the force of gravity. The liquid remains on the reactant surface during the tilting.

In another aspect, the present invention provides a method of contacting a reactant with an analyte by providing a microarray device with a hydrophilic reactant surface, wherein the reactant surface includes a plurality of reactant sites dispersed over the reactant surface, wherein the plurality of reactant sites are distinct from each other, and wherein the reactant surface has a first edge and a second edge located opposite each other. The method further includes depositing a quantity of a liquid and an analyte on the reactant surface; tilting the reactant surface in a first direction about an axis of rotation while the analyte and liquid on the reactant surface are exposed, wherein a portion of the liquid moves towards the first edge of the reactant surface under the force of gravity and forms a bead above the reactant surface proximate the first edge of the reactant surface after tilting the reactant surface in the first direction; and tilting the reactant surface in a second direction about the axis of rotation while the analyte and liquid on the reactant surface are exposed during the tilting, wherein a portion of the liquid moves from the first edge towards the second edge under the force of gravity and forms a bead above the reactant surface proximate the second edge of the reactant surface after tilting the reactant surface in the second direction. The liquid remains on the reactant surface during the tilting In another aspect, the present invention provides a microarray device for low volume fluid processing that includes a substrate; a hydrophilic microreplicated structured reactant surface on the substrate; and a plurality of reactant sites dispersed over the reactant surface, wherein the plurality of reactant sites are distinct from each other.

In another aspect, the present invention provides an apparatus for low volume fluid processing that includes a carrier and a plurality of separate reactant surfaces located on a surface of the carrier, wherein each reactant surface is a hydrophilic microreplicated structured reactant surface and includes a plurality of reactant sites dispersed over the reactant surface, wherein the plurality of reactant sites are distinct from each other.

In another aspect, the present invention provides an apparatus for low volume fluid processing that includes a carrier and a plurality of separate reactant surfaces located on a surface of the carrier in an 8×12 array with 9 millimeter (mm) spacing in both row and column directions, wherein each reactant surface is a hydrophilic reactant surface and includes a plurality of reactant sites dispersed over the reactant surface, wherein the plurality of reactant sites are distinct from each other.

In another aspect, the present invention provides a system for low volume microarray device processing, the system including a processing chamber; temperature control apparatus operable within the processing chamber to control the temperature within the processing chamber; and rotational apparatus within the processing chamber, the rotational apparatus operable to tilt a microarray device located within the processing chamber.

These and other features and advantages of the invention may be are described in more detail below with respect to illustrative embodiments of the invention.

DETAILED DESCRIPTION OF ILLUSTRATIVE EMBODIMENTS OF THE PRESENT INVENTION

Figure 1:
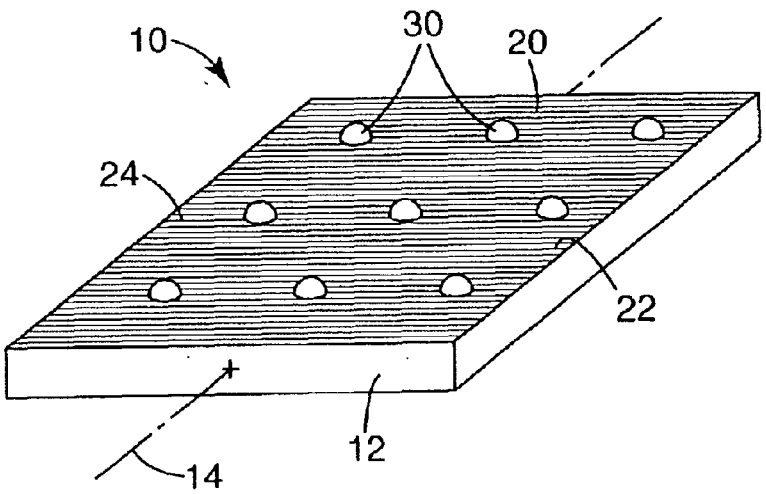
FIG. 1 is a prospective view of one microarray device according to the present invention.

The present invention provides devices, methods and systems for low volume microarray processing. The analyte samples are in the form of a liquid that is deposited on a reactant surface of the microarray devices of the present invention. The analyte samples may, for example, include one or more analytes in a carrier liquid (where the carrier liquid may include one or more different constituents). Distribution of the analyte sample and its analytes over the reactant surface is accomplished by tilting the reactant surface such that the liquid analyte sample flows generally uniformly over the entire reactant surface without voids under the force of gravity. Flow of the analyte sample over the reactant surface may also be beneficial for mixing the analyte or analytes within the sample liquid over the reactant surface of the microarray devices.

Surface tension in the analyte sample and capillary forces work to retain the analyte sample on the reactant surface while the reactant surface is tilted. Balancing fluid retention on the reactant surface, it is preferred that the liquid analyte sample move across the reactant surface as the reactant surface is tilted in a manner that results in wetting of the entire reactant surface.

Generally, the susceptibility of a solid surface to be wet out by a liquid is characterized by the contact angle that the liquid makes with the solid surface after being deposited on the horizontally disposed surface and allowed to stabilize thereon. It is sometimes referred to as the "static equilibrium contact angle," sometimes referred to herein merely as "contact angle". As discussed in U.S. Pat. No. 6,372,954 B1 (Johnston et al.) and International Publication No. WO 99/09923 (Johnston et al.), the contact angle is the angle between a line tangent to the surface of a bead of liquid on a surface at its point of contact to the surface and the plane of the surface. A bead of liquid whose tangent was perpendicular to the plane of the surface would have a contact angle of 90 degrees. Typically, if the contact angle is 90 degrees or less, the solid surface is considered to be wet by the liquid. Surfaces on which drops of water or aqueous solutions exhibit a contact angle of less than 90 degrees are commonly referred to as "hydrophilic."

As used herein, "hydrophilic" is used only to refer to the surface characteristics of a material, i.e., that it is wet by aqueous solutions, and does not express whether or not the material absorbs or adsorbs aqueous solutions. Accordingly, a material may be referred to as hydrophilic whether or not a layer of the material is impermeable or permeable to aqueous solutions. Thus, hydrophilic films used as reactant surfaces of the invention may be formed from films prepared from resin materials that are inherently hydrophilic, such as for example, poly(vinyl alcohol).

Liquid analyte samples that yield a contact angle of near zero on a surface are considered to completely wet out the surface. Polyolefins, however, are typically inherently hydrophobic, and the contact angle of a polyolefin film, such as polyethylene or polypropylene, with water is typically greater than 90 degrees. Many of the analyte samples that will be deposited on the reactant surfaces of the present invention are aqueous. Thus, if such films are used for the reactant surface of the invention, they may need to be modified, e.g., by surface treatment, application of surface coatings, or incorporation of selected agents, such that the surface is rendered hydrophilic so as to exhibit a contact angle of 90 degrees or less, thereby enhancing the wetting and liquid transport properties of the reactant surface. Any suitable known method may be utilized to achieve a hydrophilic surface on liquid management films of the present invention. Surface treatments may be employed such as topical application of a surfactant, plasma treatment, grafting hydrophilic moieties onto the film surface, sol-gel coating, corona or flame treatment, etc. Alternatively, a surfactant or other suitable agent may be blended with the resin as an internal additive at the time of film extrusion. It may, however, be preferred to incorporate a surfactant in the polymeric composition from which the reactant surface is made rather than rely upon topical application of a surfactant coating.

FIG. 1 is a perspective view of a microarray device 10 according to the present invention. The microarray device 10 includes a reactant surface 20 with two opposing edges 22 and 24. Reactant sites 30 are distributed over the reactant surface 20. Although the reactant sites 30 are depicted as being distributed in a regular, ordered array over the reactant surface 20, it will be understood that the reactant sites 30 could be distributed in any suitable manner or pattern over the reactant surface 20. For example, the reactant sites 30 may alternatively be distributed randomly in an irregular fashion over the reactant surface 20. In another alternative, the reactant sites 30 may be distributed in different patterns or manners over different portions of the reactant surface 20.

The microarray device 10 also includes a substrate 12 on which the reactant surface 20 is located. The substrate 12 may take any suitable form. For example, substrate 12 may be formed of a glass, polymer, silicon or other suitable material. Although the reactant surface 20 is depicted as occupying substantially all of a surface of the substrate 12, the reactant surface 20 may, in some instances, be smaller or larger than the substrate 12. In another variation, it should understood that although the reactant surface 20 and/or substrate 12 are depicted as being relatively flat, they could be formed in any other suitable shape, e.g., concave, cylindrical, etc.

Also depicted in FIG. 1 is an axis 14 that extends between opposing edge is 22 and 24 of the reactant surface 20. It is about this axis that the microarray device 10 is tilted to distribute and/or mix the analyte sample over the reactant surface 20 as will be described in more detail below.

Figure 2:
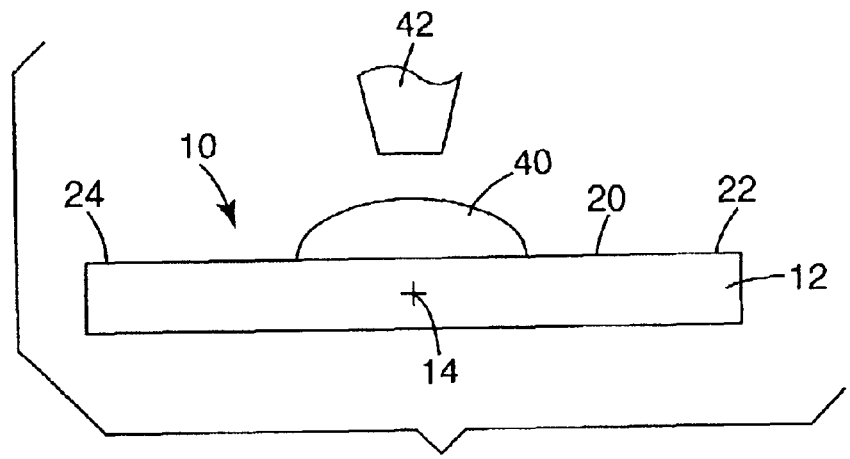
FIG. 2 is an edge view of the microarray device of FIG. 1 taken along axis 14 and depicting the depositing of a liquid upon the reactant surface of the microarray device.

FIG. 2 is an edge view of the microarray device 10 of FIG. 1 taken along axis 14 (which is, therefore, seen as a point in FIG. 2). The microarray device 10 includes a substrate 12 and opposing edge is 22 and 24 located on opposite sides of the axis 14. Also seen in FIG. 2 is a delivery device 42 used to deposit a liquid analyte sample 40 on reactant surface 20 of microarray device 10. The delivery device 42 may take any form such as a pipette or other fluid delivery device. The delivery device 42 may be manually operated or it may be part of an automated fluid delivery system.

The analyte sample 40 includes one or more analytes that the user desires to expose to the reactants in reactant sites 30 on the reactant surface 20. It may be desirable to deposit the analyte sample 40 proximate a center of the reactant surface 20, although it will be understood that it may be possible to deposit the analyte sample 40 in almost any location on the reactant surface 20 and obtain the desired distribution of the analyte sample 40 over the reactant surface 20 by tilting the microarray device 10 as described below.

In some instances, the analyte sample 40 may wick or distribute itself over the reactant surface 20 without or in the absence of tilting of the microarray device 10. In other instances, the analyte sample 40 may not be distributed over the entire reactant surface 20 without some manipulation of the reactant surface 20 that causes the analyte sample 40 to flow over the reactant surface 20.

In another variation, it should be understood that the analyte sample 40 may be deposited in steps. For example, in some situations, it may be desirable to deposit one or more analytes separately from a carrier liquid that is used to distribute the one or more analytes over the reactant surface 20. In such situations, the one or more analytes may be deposited before or after the carrier liquid depending on the nature of the analytes and the desirability of depositing them before or after depositing the carrier liquid.

Figure 3:
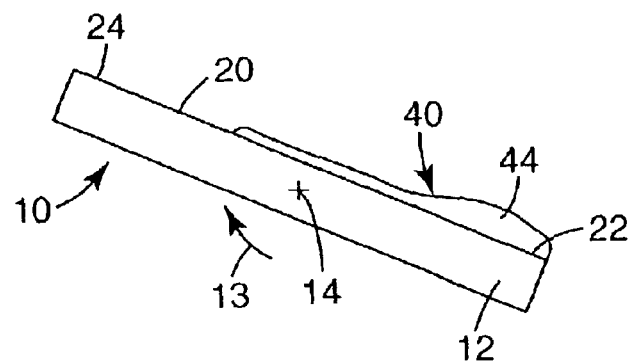
FIG. 3 is a view of the microarray device of FIG. 2 tilted in a first direction about axis 14.

FIG. 3 is a view of the microarray device 10 of FIG. 2 after rotation in a first direction 13 about axis 14. The analyte sample 40 has been distributed at least partially over the reactant surface 20 as a result of tilting of the reactant surface 20. The analyte sample 40 or at least a portion thereof, has accumulated and formed a bead 44 along edge 22 of the reactant surface 20. Due to the capillary forces and the surface tension of the analyte sample 40, the analyte sample 40 is retained on the reactant surface 20 without spillage or leakage in spite of the angled orientation of the reactant surface 20 and the gravitational forces exerted on the analyte sample 40.

The analyte sample 40 is not yet distributed over the entire reactant surface 20. For example, edge 24 is essentially free of the analyte sample 40 during this stage of processing because the gravitational forces exerted on the liquid draw it towards edge 22 and away from edge 24 of the reactant surface 20.

Depending on the viscosity of the analyte sample 40 and other variables, it may be required to rotate the microarray device 10 to lower the first edge 22 relative to the gravitational forces to a greater or lesser degree than that depicted in FIG. 3. For example, a higher viscosity analyte sample 40 may move or distribute over the reactant surface 22 with a lesser amount of rotation as compared to a higher viscosity analyte sample 40. In addition, may be desired to allow the reactant surface 20 to remain stationary for a dwell time at an angled orientation (such as that seen in FIG. 3) to provide time for the analyte sample 40 to flow and accumulate in a bead 44 along the first edge 22 of the reactant surface 20. In other instances, a dwell time at one end of the rotational range may not be required.

It should be understood that the movement of liquids on reactant surfaces as described in connection with the present invention will be under the force of gravity, whether the gravitational force is the result of actual gravity or apparent gravity. Apparent gravity may be provided by rotational forces developed to simulate gravity where sufficient actual gravity is not present or where it is desired to provide a controlled amount of quasi-gravitational force to distribute the liquid is over the reactant surface of microarray devices according to the present invention. For example, apparent gravity may be generated within a rotating system in any orientation. In contrast, actual gravity is based on gravitational forces developed by the mass of, e.g., the Earth. It may be preferred that the gravitational forces operating on the analyte sample be about 1G or less. Furthermore, tilting of the reactant surfaces as described herein will preferably be performed about a horizontal axis (or axes) generally perpendicular to the force vector of the actual or apparent gravity.

Figure 4:
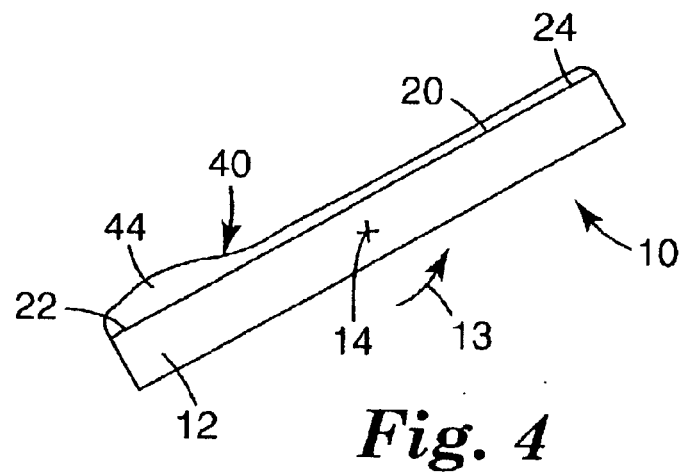
FIG. 4 is a view of the microarray device of FIG. 2 tilted in a second direction about axis 14.

FIG. 4 depicts the microarray device 10 after rotation in a second direction 15 about axis 14. In this orientation, the reactant surface 20 includes edge 24 at an orientation that results in flow of a portion of the analyte sample 40 away from edge 22 and towards edge 24. The reactant surface 20 may preferably be retained in an orientation as seen in FIG. 4 until a portion of the analyte sample 40 accumulates in a bead 44 along edge 24 of the reactant surface 20.

As a result of the flow of analyte sample 40 over the reactant surface 20, the analyte sample 40 will typically be distributed over substantially all of the reactant surface 20 between edge 22 and edge 24. The bead 44 of analyte sample 40 is now preferably located at edge 24 of the reactant surface 20.

Where the goal is to merely distribute the analyte sample 40 over the reactant surface 20 it may be sufficient to allow the reactant surface 20 to remain in the orientation as seen in FIG. 4. Alternatively, it may be desirable to rotate the reactant surface 20 with analyte sample 40 located thereon to a neutral position as seen in, e.g., FIG. 2 where the analyte sample 40 does not accumulate in a bead on the reactant surface 20.

Where, however, it is desired to further mix the analyte sample 40 over the reactant surface 20 it may be desirable to continue to rotate the reactant surface 20 between orientations as seen in FIGS. 3 and 4. For example, during processing it may be desirable to rock the reactant surface 20 and its associated substrate back and forth in directions 13 and 15 to provide for continued mixing and distribution of analyte sample 40 over the reactant surface 20. As the reactant surface 20 becomes wetted by the analyte sample 40, it may be desirable to rotate or tilt the reactant surface 20 and associated substrate 12 to a lesser degree. Furthermore, it may be desirable to increase or decrease dwell time of the reactant surface 20 at one or more different orientations. Other variations may include, for example, changing the rotational speed of the reactant surface.

Another variation in connection with the present invention is the location of the axis of rotation about which the microarray device 10 and its reactant surface 20 are rotated to provide the desired tilting. In the embodiment depicted in FIGS. 1–4, the axis 14 lies within a plane that is located proximate a midpoint of the reactant surface 20 between the first edge 22 in the second edge 24. The plane in which axis 14 is located may be, for example, generally transverse or perpendicular to the reactant surface 20 (where the reactant surface is flat). Location of the axis 14 may, however, be changed such that fluid flow across the reactant surface 20 may be obtained when the reactant surface 20 is rotated about the axis. Where actual gravity is used as the motive force to obtain fluid flow, the rotation would result in a difference in height between the edges 22 and 24 of the reactant surface 20. For example, the axis 14 may be located outside of the area occupied by the reactant surface 20 (see FIG. 8 below).

Although the axis 14 is depicted as being located within the substrate 12, the axis 14 may be located in any convenient location, e.g., above or below the substrate 12. For example, if the microarray device 10 is to be located on a conventional rocking device, the axis 14 will typically be located below the substrate 12, i.e., on the opposite side of the substrate 12 from the reactant surface 20.

Figure 5:
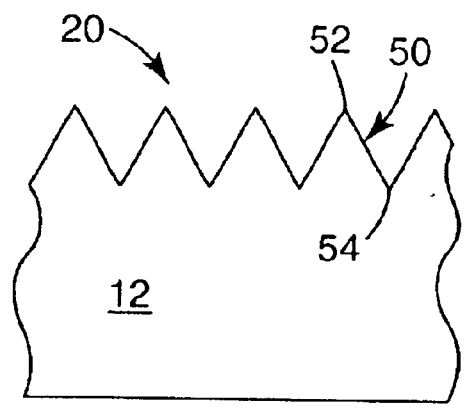
FIG. 5 is an enlarged partial cross-sectional view of the microarray device of FIG. 1 depicting one exemplary structure for a reactant surface on a microarray device according to the present invention.

FIG. 5 is an enlarged partial cross-sectional view of a portion of the reactant surface 20 and associated substrate 12. The reactant surface 20 may be a structured surface to facilitate distribution and/or retention of any analyte sample 40 located on the reactant surface 20. One potential structure that may be useful in that regard is a series of aligned channels 50. Each of the channels 50 in the depicted embodiment is formed by a pair of sidewalls 52 and a valley 54 such that channels 50 are formed in the reactant surface 20. The sidewalls 52 of adjacent channels 50 may meet to form peaks 56 as seen in FIG. 5.

It should be noted that in some instances, the analyte sample may not distribute over the entire width of the reactant surface 20 (where the width is measured along the direction of axis 14) until the reactant surface 20 has been tilted at least once such that a bead 44 of the analyte sample 40 forms along an edge of the reactant surface 20. Distribution over the width of the reactant surface may be limited by, e.g., the volume of the analyte sample 40, which may be insufficient to fill the channels 50 (or other structures) on the reactant surface 20 until accumulated along an edge of the reactant surface 20 in a bead 44, at which point the analyte sample 40 can spread across the width of the reactant surface 20.

It may be preferred that the channels 50 extend continuously over the length of the reactant surface 20 between edge 22 and edge 24. Alternatively, the channels 50 may not be continuous between the opposing edges. It may further be preferred that the channels 50 be aligned such that they are parallel to each other over the reactant surface 20, although it should be understood that the channels 50 need not necessarily be parallel to each other.

In other variations, the structures formed on a structured reactant surface 20 may take any suitable shape. For example, it may be advantageous to use channels that are not V-shaped as seen in FIG. 5. In other instances, it may be desirable to provide an array of, e.g., pyramid-shaped or other structures that may define channels or fluid paths in more than one direction on the reactant surface. Examples of alternative channeled structures can be found in, e.g., U.S. Pat. No. 6,372,954 B1 and U.S. Pat. No. 6,431,695 B1, as well as International Publication No. WO 99/09923 (all to Johnston et al.).

A structured reactant surface may be manufactured using any suitable technique or techniques such as, e.g., microreplication, machining, stamping, embossing, etc. Examples of suitable techniques for forming structured surfaces useful in connection with the present invention may be described in, e.g., U.S. Pat. No. 6,431,695 (Johnston et al.) and U.S. Pat. No. 6,372,954 (Johnston et al.), as well as International Publication Nos. WO 99/09923 (Johnston et al.) and WO 99/65664 (Bentsen et al.).

Structured reactant surfaces of the present invention may preferably, but not necessarily, be microreplicated. The use of microreplicated structured reactant surfaces may be beneficial because the reactant surfaces can be mass produced without substantial variation from product-to-product and without using relatively complicated processing techniques. "Microreplicated" as used in connection with the present invention means the production of a structured surface through a process where the structured surface features retain an individual feature fidelity during manufacture, from product-to-product, that varies no more than 50 micrometers. The microreplicated structured reactant surfaces preferably are produced such that the structured surface features retain an individual feature fidelity during manufacture, from product-to-product, which varies no more than 25 micrometers.

In accordance with the present invention, a microreplicated structured reactant surface comprises a surface with a topography (the surface features of an object, place or region thereof) that has individual feature fidelity that is maintained with a resolution of between 50 micrometers and 0.05 micrometers, more preferably between 25 micrometers and 1 micrometer.

It will be understood that the reactant surface 20 and substrate 12 may be provided as a one-piece completely integral structure as seen in FIG. 5. Alternatively, the reactant surface and its associated structure may be formed separately from a substrate and attached thereto.

Figure 6:
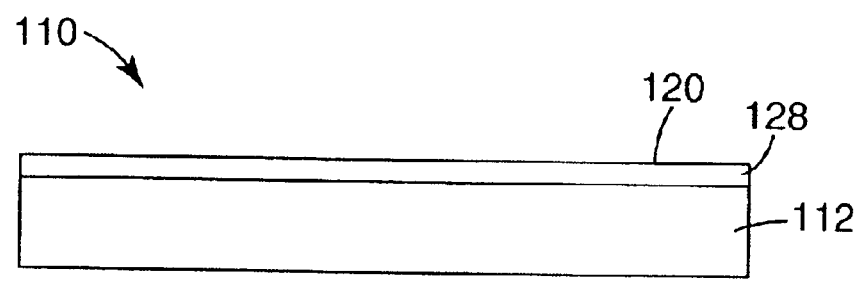
FIG. 6 is an edge view of an alternative embodiment of a microarray device according to the present invention.

FIG. 6 depicts a construction for a microarray device 110 that includes a reactant surface 120 that is formed as a separate structure 128 attached to a substrate 112. The reactant surface 120 may be formed of, for example, a separate film or membrane that exhibits porosity such that a liquid located thereon is absorbed or adsorbed to retain the liquid on the reactant surface. Examples of suitable membranes include a nylon microporous membrane such as that manufactured by Biorobotics, Inc. and marketed under the tradename TAS with a 0.45 micron pore size.

Alternative structures for layer 128 and its associated reactant surface 120 may include, but are not limited to, fibrous materials (woven, nonwoven, etc.), immobilized beads or other objects, roughened surfaces (e.g., etched glass), etc.

Another alternative construction for layer 128 and its associated reactant surface 120 may include the undulated surfaces described in, e.g., U.S. Pat. No. 6,395,483 B1 (Patil et al.) and International Publication Number WO 99/53319 (Halverson et al.). Those references also describe various alternatives for the substrate 112, e.g., elastic materials, oriented polymeric films, etc.

Figure 6A:
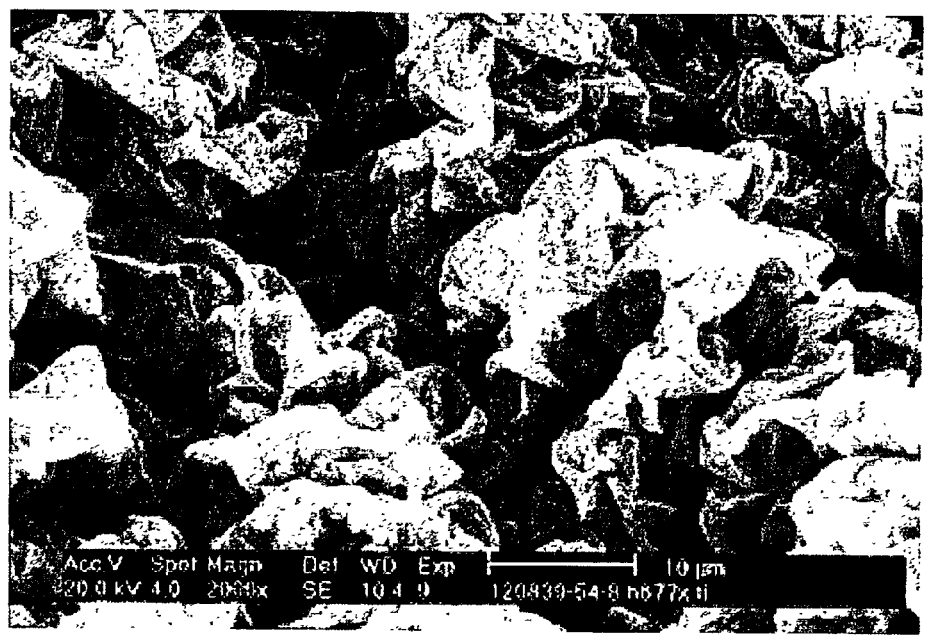
FIG. 6A is an SEM of the reactant surface of a titanium-coated substrate after relaxation.
Figure 6B:
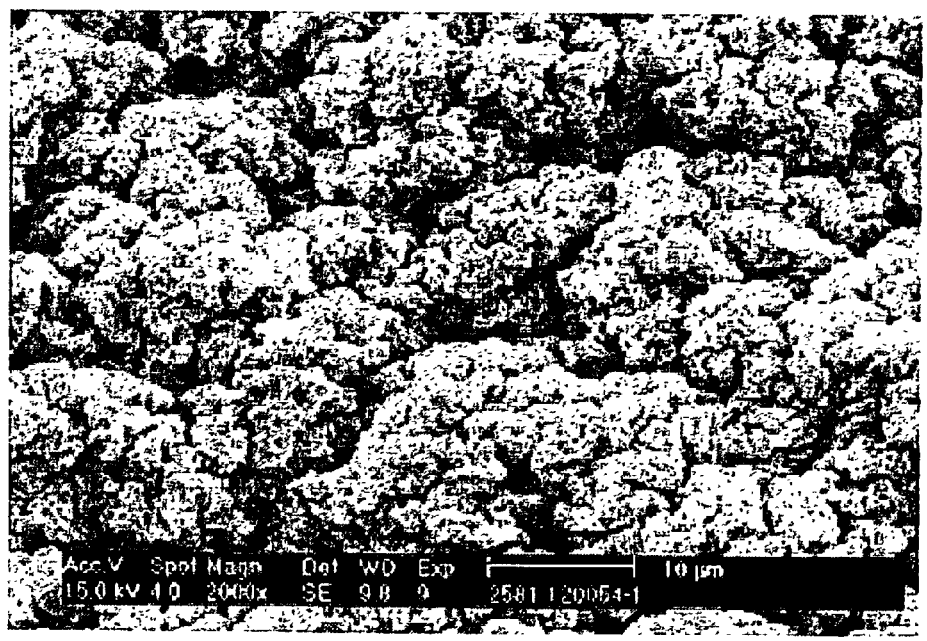
FIG. 6B is an SEM of the reactant surface of a gold-coated substrate after relaxation.

As used in connection with the present invention, the term "undulations" or "undulated" shall mean convoluted, wave-like forms such as those seen in, e.g., FIGS. 6A & 6B. For purposes of this invention, is preferred that an undulated surface includes undulations that are irregular as to pattern. "Undulations" or "undulated" does not include structures such as channels, reservoirs or microwells that are created by methods such as, e.g., printing, embossing, casting, molding, laser scribing, photolithography, etching, mechanical scratching or scoring, etc.

Such undulated surfaces may include one or more coatings that are attached to substrate 112. Typically, the undulations are formed when the substrate 112 is reduced in size by relaxing, for example, an oriented polymeric film or allowing an elastic substrate to relax as described in the references identified above. Advantages of undulated surfaces include a topographical surface area that is greater than the projected surface area of the reactant surface 120. As used herein, the "topographical surface area" shall mean the actual surface area of the reactant surface 120, in other words, a measurement of the surface area of all of the undulated features of the reactant surface 120. "Projected surface area" shall mean a measurement of the area defined by projecting the reactant surface 120 onto a plane facing the reactant surface 120.

Figure 7:
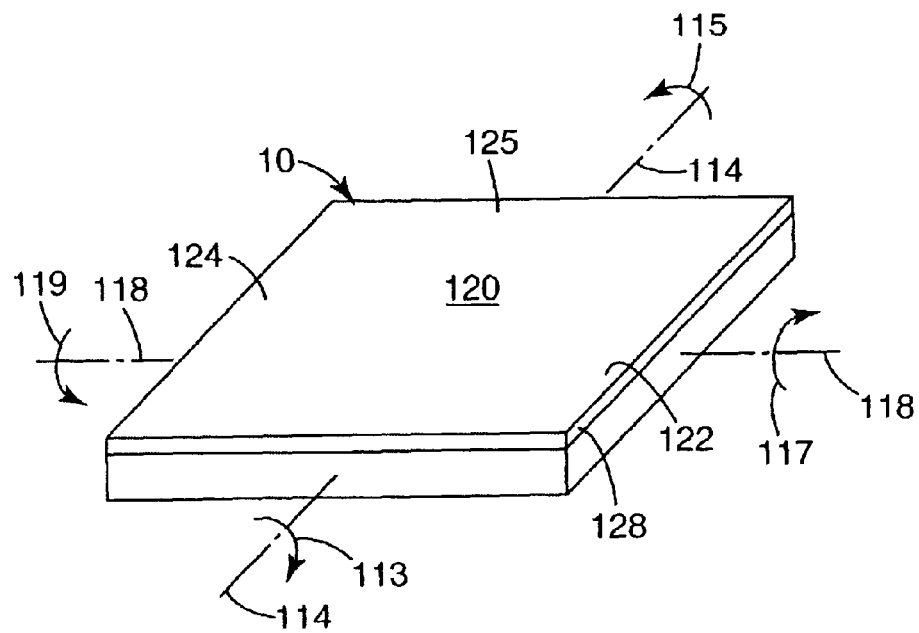
FIG. 7 is a perspective view of the microarray device of FIG. 6.

FIG. 7 is a perspective view of the microarray device 110 of FIG. 5 and will be used to describe some alternate methods of tilting a reactant surface according to the methods of the present invention. Two axes of rotation 114 and 118 are depicted in FIG. 7, with the axes being preferably oriented perpendicular to each other. It will be understood, however, that the axes 114 and 116 may not necessarily be perpendicular to each other.

Rotation of the microarray device 110 may be performed by tilting the reaction surface 120 about axis 114 in opposing directions 113 and 115 in a manner similar to the tilting of reaction surface 20 about axis 14 as described in connection with FIGS. 3 and 4 above. That tilting preferably results in flow of an analyte sample over the reaction surface 120 towards edge 122 or edge 124. Preferably, the flow results in accumulation of a portion of the analyte sample along the lower edge of the reactant surface as described above.

Rotation of the microarray device 110 may also or alternatively be performed by tilting the reaction surface 120 about axis 118 in opposing directions 117 and 119 in a manner similar to the tilting of reaction surface 20 about axis 14 as described in connection with FIGS. 3 and 4 above. That tilting preferably results in flow of an analyte sample over the reaction surface 120 towards edge 123 or edge 125. Preferably, the flow results in accumulation of a portion of the analyte sample along the lower edge of the reactant surface as described above.

The order of rotation about the different axes 114 and 118 may be selected to achieve the desired distribution and/or diffusion of the analyte sample over the reactant surface 120. For example, it may be desirable to initially tilt reactant surface 120 about axis 114 in opposite directions 113 and 115 for one or more times, followed by tilting of the reactant surface 120 about axis 118 in opposing directions 117 and 119 for one or more times.

In another variation, it may be preferred to tilt the reactant surface 120 about axes 114 and 118 in an alternating manner. For example, reaction surface 120 may first be tilted in direction 113 about axis 114 such that the analyte sample flows towards and accumulates along edge 122. The next step could involve tilting the reaction surface 120 about axis 118 in, e.g., direction 117 and/or opposite direction 119. That second tilting action about axis 118 could be performed before the reactant surface 120 is tilted back in direction 115 to a horizontal position or, alternatively, while the reactant surface 120 is held in a horizontal or neutral position with respect to the gravitational force acting on the analyte sample. In some instances, it may be desirable to tilt the reactant surface 120 about axis 114 in directions 113 and 115 for one or more times before tilting the reactant surface 120 about axis 118 in directions 117 and 119.

In still another variation, the reactant surface 120 may be tilted about both axes 114 and 118 simultaneously such that the reaction surface 120 tilts in an orbital manner. Such tilting may be described as simultaneous multi-axis tilting. In some instances, the bead of liquid analyte sample may propagate in a radial manner about the reactant surface 120.

Figure 8:
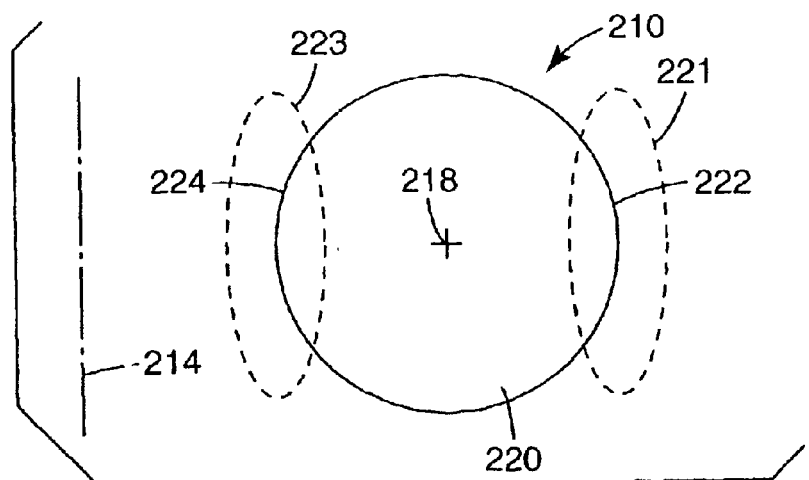
FIG. 8 is a plan view of a nonrectangular microarray device according to the present invention.

Turning now to FIG. 8, another alternative embodiment of a microarray device according to the present invention is depicted. One difference between microarray device 210 and microarray device 10 as seen in FIG. 1 is that the microarray device 210 includes a reactant surface 220 that is not rectangular in shape. The reactant surface 220 in FIG. 8 is generally circular in shape and illustrates the principle that the reactant surfaces in microarray devices according to the present invention may take any selected shape.

The microarray device 210 also includes two opposing edges 222 and 224 located on opposing sides of reactant surface 220 with respect to the axis of rotation 214. Edges 222 and 224 are not straight lines as seen in connection with microarray device 10 of FIG. 1. Rather, edges 222 and 224 are in the form of arcs located within areas 221 and 223, respectively.

As can be seen in FIG. 8, the axis of rotation 214 is located outside the area occupied by reactant surface 220. Nonetheless, axis 214 is useful in defining the opposing edges 222 and 224. Furthermore, rotation of the microarray device 210 about the axis of rotation 214 will still cause fluid to flow across the reactant surface 220 between opposing edges 222 and 224.

Figure 9:
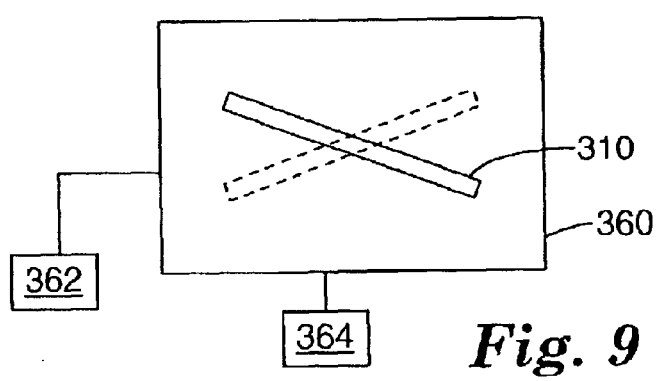
FIG. 9 is a schematic diagram of one system according to the present invention.

A system useful in performing processes using the microarray devices of the present invention is depicted in FIG. 9. The system includes a microarray device 310 located within a processing chamber 360. The microarray device 310 may be tilted within processing chamber 360 to provide distribution and/or diffusion of an analyte sample over a reactant surface of the microarray device 310 according to the principles described above. In addition, the system may also include a temperature control apparatus 362 and a rotational apparatus 364 for providing the desired rotation of microarray device 310 within chamber 360.

The temperature control apparatus 362 may include one or both of heating and cooling apparatus capable of maintaining the desired temperature within the processing chamber 360. The temperature control apparatus 360 may include, e.g., apparatus for controlling the temperature of the air (or other gas) within the processing chamber 360. The temperature control apparatus 362 may include apparatus for controlling the temperature of a microarray device or devices located within the processing chamber 360 through conduction, using, e.g., a thermal block on which the microarray devices (or a carrier on which they are mounted) are located.

One example of a rotational apparatus may be, e.g., a rocker platform such as a Robbins Scientific Model 400HI, Sunnyvale, Calif.

It may be desirable that chamber 360 be sealed to maintain humidity and/or other environmental characteristics that may be useful during processing of analytes and reactants on microarray device 310. The optional temperature control apparatus 362 may be useful when the process requires heating and or cooling of the chamber 360 during processing of the analytes and reactants on microarray device 310.

Figure 10:
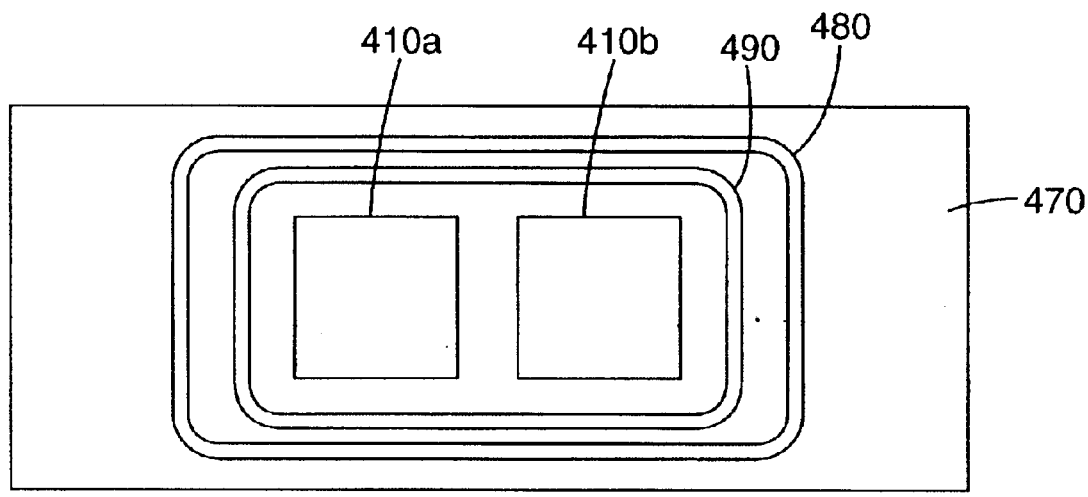
FIG. 10 is a plan view of one apparatus incorporating two microarray devices according to the present invention.
Figure 11:
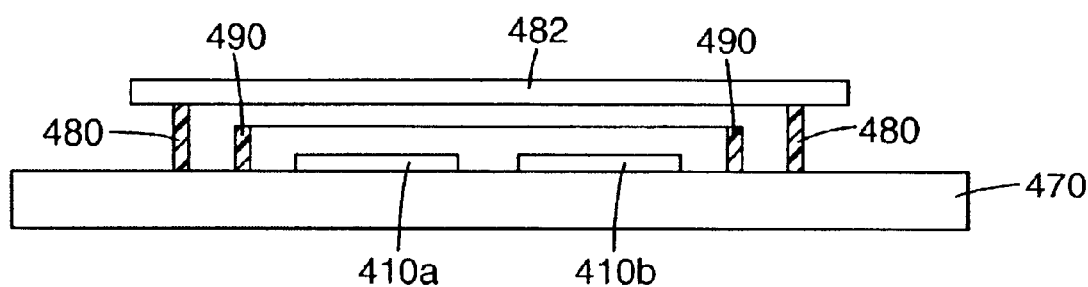
FIG. 11 is an edge view in partial cross-section of the apparatus of FIG. 10.

Although the microarray devices according to the present invention may be used alone, in many instances it may be desirable to use two or more of the microarray devices in an apparatus that is then processed to obtain a desired reaction between the analytes and reactants located on the reactant surface of the microarray devices according to the present invention. One embodiment of an apparatus including two microarray devices 410a and 410b (referred to collectively below as microarray devices 410) is depicted in FIGS. 10 and 11. It should be understood that the depicted apparatus is exemplary in nature only.

In the depicted embodiment, gaskets are also provided on the carrier 470 to, for example, provide protection to the microarray devices 410 located on carrier 470. The outermost gasket 480 may be used, for example, to support a cover 482 which can be located over microarray devices 410 during thermal processing of any analytes and reactants on microarray devices 410. The use of a cover 482 is one example of a technique to maintain humidity within the volume in which the reactant surfaces on the microarray devices 410 are located. In other instances, the cover 482 may provide protection from other environmental conditions such as undesirable radiation, contamination, etc. Although the gasket 480 and cover 482 are depicted as separate articles, it will be understood that the gasket 480 may be a part of the cover 482 such that removal of the cover 482 also results in removal of the gasket from carrier 470.

Another optional feature depicted in connection with carrier 470 is the inner gasket 490 which may be used when imaging the microarray devices 410 located on carrier 470. For example the gasket 490 may be constructed of an opaque material such that imaging of the microarray devices 410 is enhanced by preventing extraneous light from entering or striking the microarray devices 410 during imaging. In other instances, the gasket 490 may function as a spacer to prevent contact between the imaging equipment and the reactant surfaces of the microarray devices 410.

In an apparatus in which the microarray devices 410 include structured reactant surfaces with channels formed thereon, it may be preferred that the channels in each of the separate microarray devices 410 be aligned with each other. In other words, all of the channels, regardless of the microarray device on which they are located, may preferably be aligned with a common axis. As a result, tilting of the carrier 470 results in substantially the same orientation for all of the channels on each of the reactant surfaces.

Figure 12:
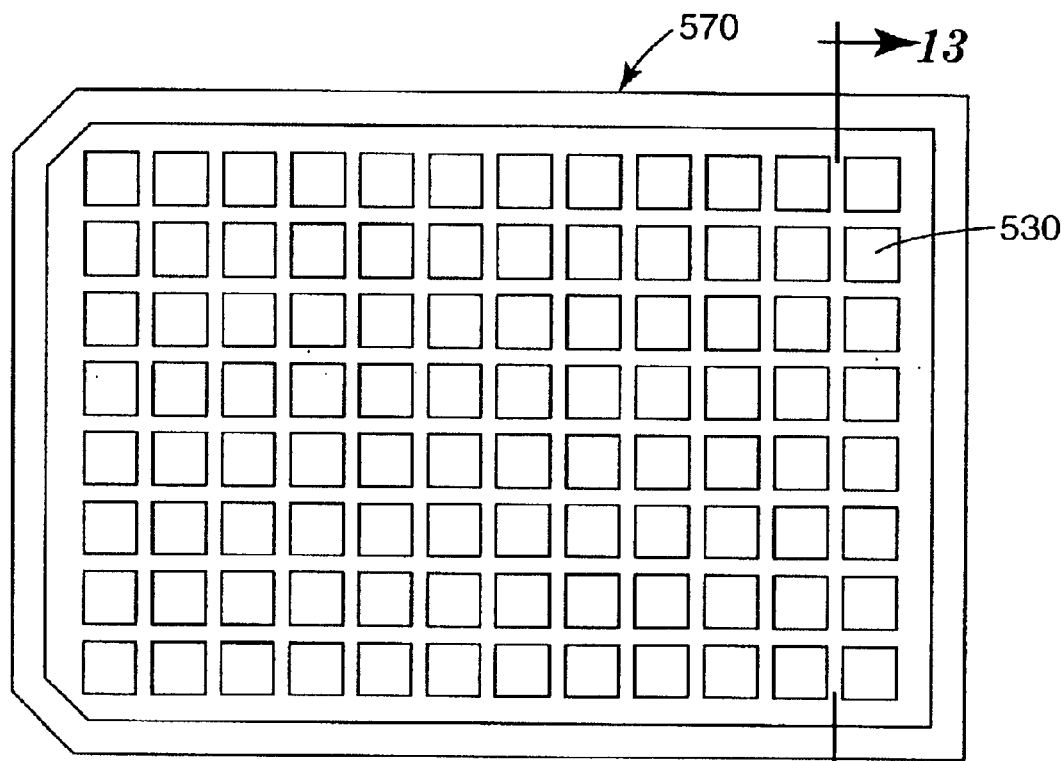
FIG. 12 is a plan view of an apparatus including 96 microarray devices according to the present invention.

FIG. 12 illustrates yet another embodiment of an apparatus including multiple microarray devices 510 on a carrier 570. The carrier 570 holds ninety-six (96) microarray devices 510 in an 8×12 array of rows and columns that are spaced at intervals consistent with a conventional 96-well microtiter plate, e.g., 9 mm center-to-center spacing between adjacent microarray devices in both row and column directions. It is preferred that the edges of adjacent microarray devices be spaced far enough apart to reduce the likelihood of cross-contamination between microarray devices, e.g., 1 mm or more. One advantage of such a construction is that the apparatus may be used in conventional analyte distribution and imaging systems with minimal modifications.

Figure 13:
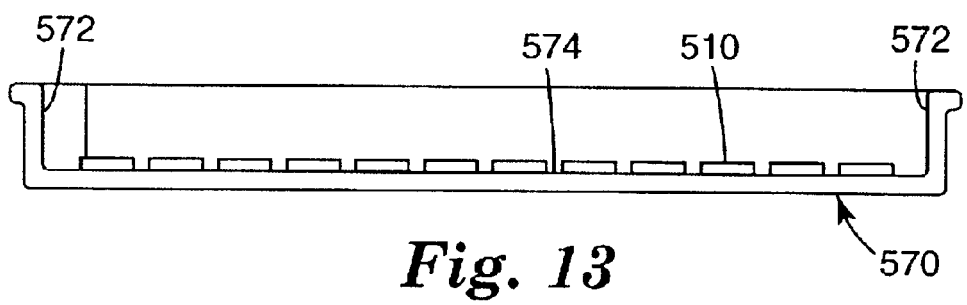
FIG. 13 is a cross-sectional view of the apparatus of FIG. 12 taken along line 13—13 in FIG. 12.

FIG. 13 is a cross-sectional view of the apparatus of FIG. 12 taken along line 13—13 in FIG. 12. The carrier 570 may preferably include sidewalls 572 that have a height normal to the surface 574 on which the microarray devices 510 are located that is similar to the height of a conventional microtiter plate to facilitate handling of the apparatus using conventional equipment. The sidewalls 572 may also provide a convenient support for a cover (not shown) during storage or processing of the microarray devices 510. Gaskets may be provided on the carrier surface 574 to reduce the likelihood of cross-contamination between the microarray devices 510, although it will be understood that any gaskets preferably do not contact the analyte sample and/or the reactant surface. Alternatively, the gaskets may be located on a cover that is placed over the carrier surface 574.

Methods of using a carrier 570 with a multiplicity of microarray devices 510 is that all of the microarray devices can be processed at the same time using the methods of tilting as described above.

EXAMPLES

The following examples have been selected merely to further illustrate features, advantages, and other details of the invention. It is to be expressly understood, however, that while the examples serve this purpose, the particular ingredients and amounts used as well as other conditions and details are not to be construed in a manner that would unduly limit the scope of this invention.

Example 1

Coated Heat Shrink Film with Undulated Surface

A sample of polyethylene heat shrink film coated with an azlactone/dimethylacrylamide copolymer was prepared according to International Publication No. WO 99/53319, providing a reactant surface having undulated wrinkles. A microarray device having dimensions of 1.8×2.5 cm was adhered to a glass microscope slide. The glass slide with microarray device was placed on a flat, level surface (0 degrees) and 100 microliters of DNA hybridization buffer (3× SSC, 0.3% SDS, 1 mg/ml Yeast tRNA and 1 mg/ml Poly A) was placed on the center of the microarray device. Radial spreading of the liquid was observed, propagating until it reached the outer edges of the microarray device. The sample was then tilted approximately 20 degrees from horizontal. The free liquid above the reactant surface was observed to migrate to the "low" side of the film, accumulating in a linear bead at the edge of the film without draining off. Rotating the microarray device the opposite direction (also 20 degrees off of horizontal) caused the liquid to propagate in a cascading "sheet" (no significant liquid fingering) over the reactant surface until it reached the other side, where a linear bead was formed.

Example 2

Nylon Membrane with Porous Fiber Network

A section of nylon membrane (TAS Membrane, 0.45 micron pore size from BioRobotics, Inc., Cambridge UK) approximately 2×2.5 cm was adhered to a glass microscope slide using double sided adhesive tape to form a reactant surface.

The glass slide was placed on a flat, level surface (0 degrees) at which time 150 microliters of water containing green food coloring was pipetted onto the center of the membrane. Radial spreading of the solution over the membrane was observed. The sample was gently rotated as described in Example 1. The free liquid not adsorbed into the membrane was observed to accumulate at the edge of the membrane without flowing over the edge. The sample was then rotated to a vertical position, i.e., a 90 degree angle off of horizontal. The solution was retained on the membrane even at that extreme angle.

Example 3

Polymeric Film with V-Channel Structures

A hydrophilic polypropylene film with a microreplicated structured surface of adjacent linear V-groove channels embossed in the surface was prepared according to U.S. Pat. No. 5,728,466. The embossed polymer surface included open V-grooves having an isosceles triangular cross section with a base angle (the bottom of the "V") of approximately 135 degrees and a height of approximately 100 micrometers. A section of film approximately 2×2 cm was adhered to a glass microscope slide using double-sided adhesive tape.

The glass slide was then placed on a flat, level surface at which time 75 microliters of water containing green food coloring (to provide contrast) was pipetted onto the center of the film. The liquid was observed to spread along the V-groove channels until it reached the edge of the film. The sample was tilted approximately 20 degrees. The liquid was observed to migrate along the channels to the "low" side of the film, accumulating at the edge of the film without draining off. As the liquid accumulated, it spread perpendicular to the direction of the V-grooves until it reached the outside edges of the film. Rotating the film 20 degrees off of horizontal in the opposite direction caused the liquid to migrate over the entire surface of the film area until it reached the opposite edge. The film was then rotated to a vertical position (90 degrees off of horizontal), at which time the liquid completely migrated to the bottom edge of the film without draining off.

Example 4

Demonstration of Low Volume Hybridization

This example demonstrates uniformity of analyte distribution over a reactant surface using the method of the present invention. Oligonucleotide arrays were prepared on coated heat shrink film as described in Example 1. Briefly, a 25 base oligonucleotide sequence was arrayed on coated heat shrink film in a pattern designed to produce evenly distributed features over the entire surface of the microarray. The pattern included 9 columns and 16 rows of quadruplicate groups of approximately 60 micrometer diameter features spaced 350 micrometers apart. The column and row spacing of the quadruplicate groups was 900 micrometers. The rectangular array (2.8 cm×3.7 cm) was mounted on a glass microscope slide using transfer adhesive.

Hybridizations were performed at a range of volumes using a complementary 25 base target sequence according to the method described in Example 1. The complimentary sequence was labeled with a fluorescent dye (Cy5, Amersham Pharmacia Biotech). Hybridization was performed using 1000 picomolar complimentary target at volumes ranging from 5 to 150 microliters in hybridization buffer (3× SSC, 0.3% SDS, 1 mg/ml Yeast tRNA and 1 mg/ml Poly A) at 50° C. for 18 hours. To prevent evaporation of the target solution, arrays were enclosed in a humidified Petri dish sealed with parafilm. Humidification inside the Petri dish was achieved using a small section of paper towel saturated with water.

The enclosed arrays were placed inside a hybridization oven having a rocker platform cycling at approximately 1 cycle per minute (Robbins Scientific Model 400HI, rocker platform 1040-21-0, Sunnyvale, Calif.). After approximately 18 hours of rocking, arrays were removed and washed for 10 minutes each with 1.1× SSC and 0.03% SDS and 0.06% SSC at 42° C. Arrays were imaged using a microarray scanner using the 635 nm channel (Axon Instruments, Foster City, Calif.). The images were examined for uniformity of fluorescent hybridization signal intensity over the microarray surface using image processing software (GenePix, Axon Instruments, Foster City, Calif.). The following table summarizes the results.

| Hybridization Volume (microliters) | Volume per square centimeter (microliters/cm$^2$) | Uniform hybridization signal across array |
|---|---|---|
| 5 | 0.5 | no |
| 10 | 1.0 | no |
| 20 | 1.9 | yes |
| 50 | 4.8 | yes |
| 75 | 7.2 | yes |
| 100 | 9.7 | yes |
| 150 | 14.5 | yes |

Example 5

Demonstration of Assay Dynamic Range and Sensitivity

Figure 14:
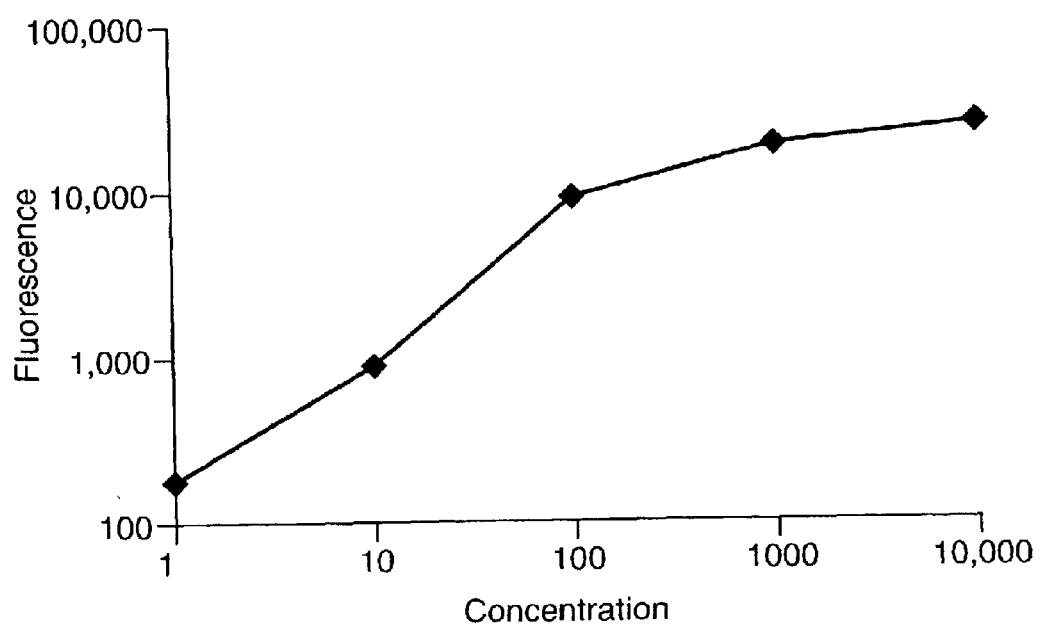
FIG. 14 is a graph of fluorescence intensity as a function of target oligonucleotide concentration as described in connection with Example 5.

Arrays having a uniform distribution of oligonucleotide features across the surface were prepared as described in Example 4. Arrays were hybridized under the conditions described in Example 4 using 100 microliters of complementary fluorescent target (providing a volume per square centimeter of 9.7) at the following target oligonucleotide concentrations: 1, 10, 100, 1000 and 10,000 picomolar. Fluorescence intensity (F635-B635) for each concentration was quantified using GenePix software (Axon Instruments, Foster City, Calif.). The data from this experiment is depicted in the graph of FIG. 14.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claim is:

1. A method of contacting a reactant with an analyte, the method comprising:
    providing a microarray device comprising a reactant surface, wherein the reactant surface comprises a plurality of reactant sites dispersed over the reactant surface, wherein the plurality of reactant sites are distinct from each other, and wherein the reactant surface comprises a first edge and a second edge located opposite each other;
    depositing a quantity of a liquid and an analyte on the reactant surface;
    tilting the reactant surface in a first direction about an axis of rotation, wherein a portion of the liquid moves towards the first edge of the reactant surface under the force of gravity forming a bead above the reactant surface proximate the first edge; and
    tilting the reactant surface in a second direction about the axis of rotation, wherein a portion of the liquid moves from the first edge towards the second edge under the force of gravity;
    wherein the liquid remains on the reactant surface during the tilting.

2. A method according to claim 1, wherein the tilting is performed while the analyte and liquid on the reactant surface are exposed.

3. A method according to claim 1, wherein tilting the reactant surface in the second direction causes a portion of the liquid to form a bead above the reactant surface proximate the second edge of the reactant surface after tilting the reactant surface in the second direction.

4. A method according to claim 3, wherein the bead of the liquid is in contact only with the reactant surface along the second edge.

5. A method according to claim 1, wherein the tilting in the first direction is performed at least two times and the tilting in the second direction is performed at least two tames.

6. A method according to claim 1, wherein the tilting comprises orienting the reactant surface 20 degrees or more from a horizontal orientation.

7. A method according to claim 1, wherein the reactant surface is hydrophilic.

8. A method according to claim 1, wherein the reactant surface comprises a microreplicated structured reactant surface.

9. A method according to claim 1, wherein the reactant surface comprises a microreplicated structured surface comprising a plurality of channels aligned with an axis extending between the first edge and the second edge.

10. A method according to claim 1, wherein the reactant surface comprises a microreplicated structured surface comprising a plurality of channels extending from the first edge to the second edge.

11. A method according to claim 1, wherein the microarray device comprises a substrate and the reactant surface comprises a coating at least partially adhered to the substrate, and further wherein the coating comprises a topographical surface area and a projected surface area, wherein the topographical surface area is greater than the projected surface area.

12. A method according to claim 11, wherein the reactant surface comprises an undulated surface.

13. A method according to claim 1, wherein the reactant surface comprises a plurality of fibers.

14. A method according to claim 1, wherein the reactant surface comprises a porous membrane.

15. A method according to claim 1, wherein the axis of rotation is located within a plane proximate a midpoint of the reactant surface between the first edge and the second edge.

16. A method according to claim 1, wherein the reactant surface is oriented generally horizontal when the liquid analyte are deposited thereon.

17. A method according to claim 1, wherein the analyte is located within the liquid, and further wherein depositing the liquid and depositing the analyte are performed at the same time.

18. A method according to claim 1, wherein the liquid and the analyze are deposited separately.

19. A method according to claim 1, wherein the liquid and the analyte are deposited at different times.

20. A method according to claim 1, wherein the bead of the liquid is in contact only with the reactant surface along the first edge.

21. A method according to claim 1, wherein the quantity of the liquid and the analyte deposited on the reactant surface is 10 microliters or less per square centimeter of the reactant surface.

22. A method of contacting a reactant with an analyte, the method comprising:
    providing a microarray device comprising a hydrophilic reactant surface, wherein the reactant surface comprises a plurality of reactant sites dispersed over the reactant surface, wherein the plurality of reactant sites are distinct from each other, and wherein the reactant surface comprises a first edge and a second edge located opposite each other;
    depositing a quantity of a liquid and an analyte on the reactant surface;
    tilting the reactant surface in a first direction about an axis of rotation while the analyte and liquid on the reactant surface are exposed, wherein a portion of the liquid moves towards the first edge of the reactant surface under the force of gravity and forms a bead above the reactant surface proximate the first edge of the reactant surface after tilting the reactant surface in the first direction; and
    tilting the reactant surface in a second direction about the axis of rotation while the analyte and liquid on the reactant surface are exposed during the tilting, wherein a portion of the liquid moves from the first edge towards the second edge under the force of gravity end forms a bead above the reactant surface proximate the second edge of the reactant surface after tilting the reactant surface in the second direction;
    wherein the liquid remains on the reactant surface during the tilting.

23. A method according to claim 22, wherein the bead of the liquid is in contact only with the reactant surface along the first edge.

24. A method according to claim 22, wherein the bead of the liquid is in contact only with the reactant surface along the second edge.

25. A method according to claim 22, wherein the quantity of the liquid and the analyte deposited on the reactant surface is 10 microliters or less per square centimeter of the reactant surface.

26. A method of contacting a reactant with an analyte, the method comprising:
    providing a microarray device comprising a flat reactant surface, wherein the reactant surface comprises a plurality of reactant sites dispersed over the reactant surface, wherein the plurality of reactant sites are distinct from each other, and wherein the reactant surface comprises a first edge and a second edge located opposite each other;
    depositing a quantity of a liquid and an analyte on the reactant surface;
    tilting the reactant surface by rotating the reactant surface in a first direction about a horizontal axis generally perpendicular to the force of gravity vector, wherein a portion of the liquid moves towards the first edge of the reactant surface under the force of gravity forming a bead above the reactant surface proximate the first edge; and
    tilting the reactant surface by rotating the reactant surface in a second direction about the horizontal axis, wherein a portion of the liquid moves from the first edge towards the second edge under the force of gravity;
    wherein the liquid is contained on the reactant surface without draining off during the tilting.

27. A method according to claim 26, wherein the tilting is performed while the analyte and liquid on the reactant surface are exposed.

28. A method according to claim 26, wherein the bead of the liquid is in contact only with the reactant surface along the first edge.

29. A method according to claim 26, wherein rotating the reactant surface in the second direction causes a portion of the liquid to form a bead above the reactant surface proximate the second edge of the reactant surface after rotating the reactant surface in the second direction.

30. A method according to claim 29, wherein the bead of the liquid is in contact only with the reactant surface along the second edge.

31. A method of contacting a reactant with an analyte, the method comprising:
    providing a microarray device comprising a flat reactant surface, wherein the reactant surface comprises a plurality of reactant sites dispersed over the reactant surface, wherein the plurality of reactant sites are distinct from each other;
    depositing a quantity of a liquid and an analyte on the reactant surface;
    tilting the reactant surface by rotating the reactant surface in a first direction about a first horizontal axis generally perpendicular to the force of gravity vector, wherein a portion of the liquid moves towards a first edge of the reactant surface under the force of gravity forming a bead above the reactant surface proximate the first edge;
    tilting the reactant surface by rotating the reactant surface in a second direction about the first horizontal axis, wherein a portion of the liquid moves towards a second edge of the reactant surface under the force of gravity;
    tilting the reactant surface by rotating the reactant surface in a third direction about a second horizontal axis generally perpendicular to the force of gravity vector, wherein a portion of the liquid moves towards a third edge of the reactant surface under the force of gravity; and tilting the reactant surface by rotating the reactant surface in a fourth direction about the second horizontal axis, wherein a portion of the liquid moves towards a fourth edge of the reactant surface under the force of gravity;

wherein the liquid is contained on the reactant surface without draining off during the tilting.

32. A method according to claim 31, wherein the tilting is performed while the analyte and liquid on the reactant surface are exposed.

33. A method according to claim 31, wherein the bead of the liquid is in contact only with the reactant surface along the first edge.

34. A method according to claim 31, wherein rotating the reactant surface in the second direction causes a portion of the liquid to form a bead above the reactant surface proximate the second edge of the reactant surface after rotating the reactant surface in the second direction.

35. A method according to claim 34, wherein the bead of the liquid is in contact only with the reactant surface along the second edge.

36. A method according to claim 31, wherein rotating the reactant surface in the third direction causes a portion of the liquid to form a bead above the reactant surface proximate the third edge of the reactant surface after rotating the reactant surface in the third direction.

37. A method according to claim 36, wherein the bead of the liquid is in contact only with the reactant surface along the third edge.

38. A method according to claim 31, wherein rotating the reactant surface in the fourth direction causes a portion of the liquid to form a bead above the reactant surface proximate the fourth edge of the reactant surface after rotating the reactant surface in the fourth direction.

39. A method according to claim 1, wherein the bead of the liquid is in contact only with the reactant surface along the first edge.

* * * * *

UNITED STATES PATENT AND TRADEMARK OFFICE
CERTIFICATE OF CORRECTION

PATENT NO. : 6,913,931 B2  Page 1 of 1
APPLICATION NO. : 10/263592
DATED : July 5, 2005
INVENTOR(S) : Kurt J. Halverson It is certified that error appears in the above-identified patent and that said Letters Patent is hereby corrected as shown below:

Column 16
Line 49, claim 5 delete the word "tames" and insert in place thereof -- times --.

Column 17
Line 16, claim 14 insert -- and -- before "analyte".
Line 22, claim 18 delete the word "analyze" and insert in place thereof -- analyte --.
Line 25, claim 20 delete "claim 1" and insert in place thereof -- claim 38 --.
Line 27, claim 20 delete the word "first" and insert in place thereof -- fourth --.
Line 56, claim 22 delete the word "end" and insert in place thereof -- and --.

Signed and Sealed this

Fifteenth Day of January, 2008

JON W. DUDAS
*Director of the United States Patent and Trademark Office*